June 27, 1961 J. W. TATTER 2,989,939
POWER BOAT HULL
Filed Dec. 17, 1956 2 Sheets-Sheet 1
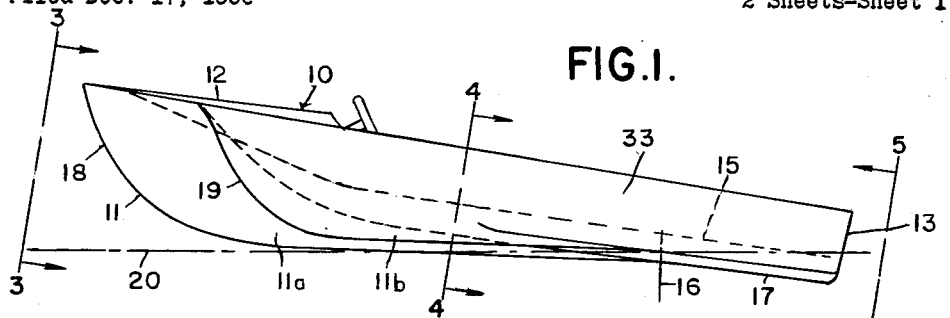
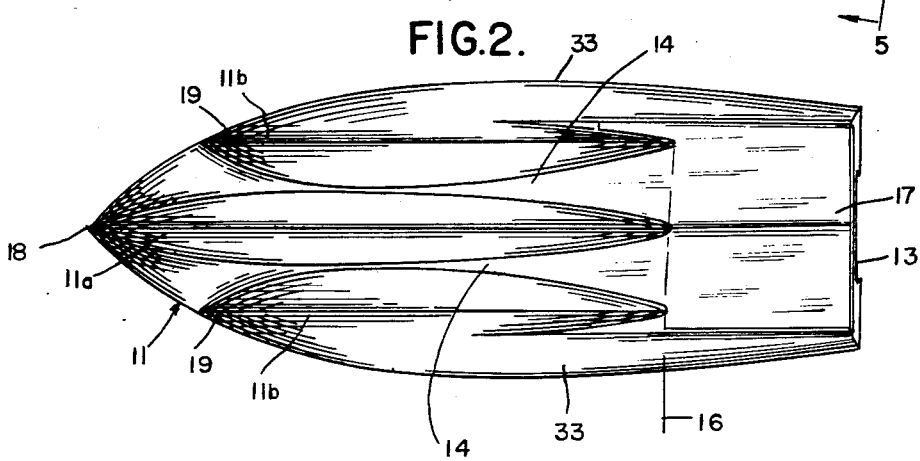
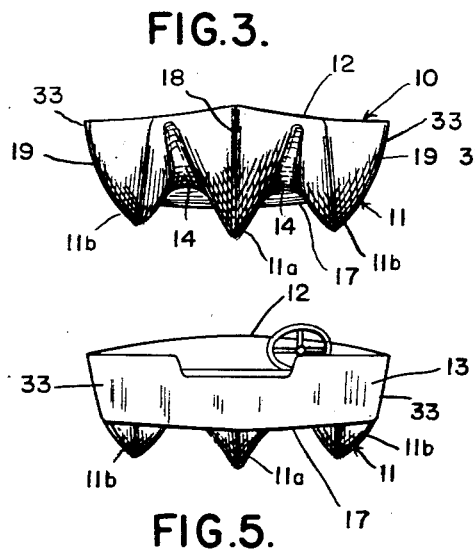
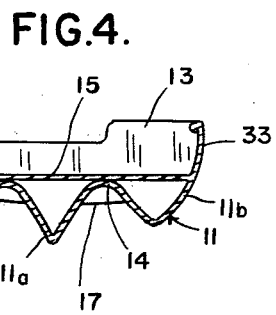
INVENTOR.
JOHN W. TATTER
BY
ATTORNEYS

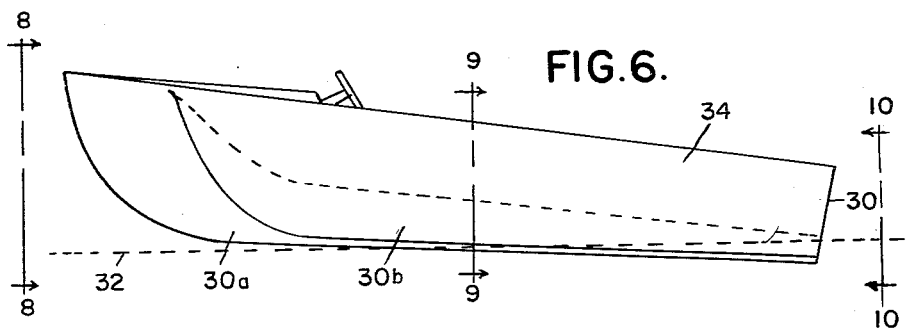
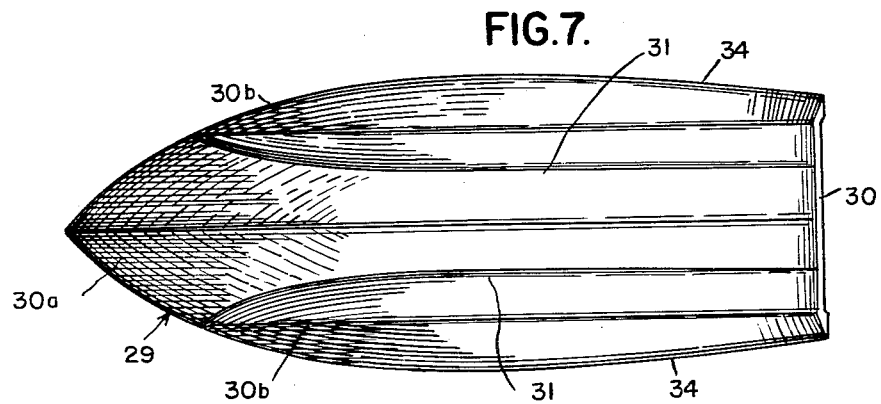
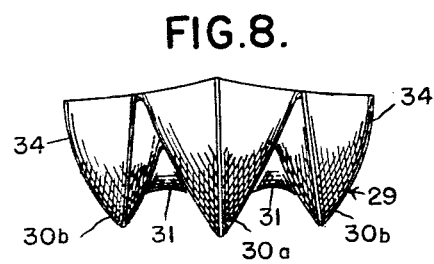
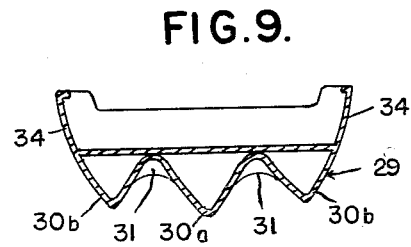
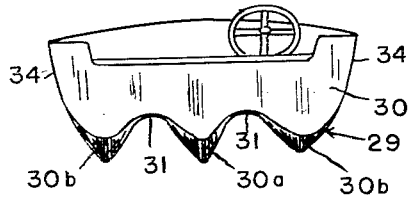

2,989,939
POWER BOAT HULL
John W. Tatter, Akron, Ohio, assignor of one-half to Lowell E. Engleking, Columbus, Ind., and one-half, by decree of distribution, to Marie W. Tatter and John Wilbur Tatter in equal proportions
Filed Dec. 17, 1956, Ser. No. 628,788
10 Claims. (Cl. 114—56)

My invention relates to power boats, and more particularly to a hull construction especially applicable with relatively wide beam outboard motor boats.

Smaller power boats, particularly of the wider beamed variety of outboard motor boats commercially available for pleasure boating, are known to be particularly uncomfortable to the occupant, especially when moving at high speeds in rough or choppy water, since the boat, riding relatively high in the water, is continuously subjected to the pounding, jarring effect of the waves. The forward end of the boat, when moving at any speed, moreover lifts high with each wave and then drops rapidly to slam into the succeeding wave. This effect is noticeable even in relatively calm water. Not only is riding made unpleasant, but such shocking forces are hard on the boat, often resulting in cracked and splintered hulls or at the least a springing of seams, ultimately causing leaks and necessitating tedious and costly repair.

An object of my invention is to diminish the roughness in riding of a power boat by constructing a hull having inherent shock-absorbing features.

Another object of my invention is to lessen the danger of damage to power boats due to the shock effect of waves and high speed by providing a hull construction having parallel keel-like portions adapted to trap cushioning air between the water and the boat bottom for dampening the effects of rough water.

A further object of the invention is to reduce the rough riding characteristics of power boats by providing a hull incorporating shock absorbing characteristics which increase in effect with an increase in speed.

For a more complete understanding of my invention, reference may be had to the accompanying drawings illustrating two preferred embodiments of the invention in which like characters refer to like parts throughout the several views and in which FIG. 1 is an elevational side view of a power boat incorporating one preferred embodiment of the hull structure of my invention.

FIG. 2 is a bottom plan view of the boat of FIG. 1.

FIG. 3 is a front elevational view of the boat as seen from the line 3—3 of FIG. 1.

FIG. 4 is a lateral cross-sectional view taken substantially on the line 4—4 of FIG. 1.

FIG. 5 is an aft elevational view of the boat as seen from the line 5—5 of FIG. 1.

FIG. 6 is an elevational side view of a power boat incorporating another preferred embodiment of the hull structure of my invention.

FIG. 7 is a bottom plan view of the boat of FIG. 6,

FIG. 8 is a front elevational view of the boat as seen from the line 8—8 of FIG. 6.

FIG. 9 is a lateral cross sectional view taken substantially on the line 9—9 of FIG. 6, and FIG. 10 is an aft elevational view of the boat as seen from the line 10—10 of FIG. 6.

Referring to FIGS. 1 through 5, a boat 10, preferably constructed for use with an outboard motor (not shown) comprises a hull structure 11, a deck structure 12, and a lateral substantially vertical rear member 13.

The hull structure 11 comprises a plurality of contoured substantially parallel, longitudinally extending keel-like portions, preferably a center portion 11a and a pair of supplementary portions 11b, one portion 11b being parallel to and spaced from each side of the center portion 11a. The portions 11a and 11b are substantially V-shaped in lateral cross-section and are joined together to form longitudinal wells 14 of contoured inverted substantially V-shape in lateral cross-section, as shown particularly in FIGS. 3, 4 and 5.

A substantially flat floor member 15 is provided in the hull structure 11 and is arranged to be supported on the upper sides of the wells 14.

The wells 14 are substantially relatively greater in depth at the forward ends than at the aft ends, and in this configuration actually ending at a lateral line indicated by the dash line 16 in FIGS. 1 and 2, which is approximately one quarter the overall length of the boat 10, from the aft end thereof, and the aft one-quarter section 17 is substantially flat bottomed, the keel-like portions 11a and 11b being contoured to decrease in depth from forward to aft and to merge into the flat-bottomed section 17.

The portions 11a and 11b are provided respectively with upwardly inclined contoured forward edges 18 and 19, the center portion edge 18 extending further forward than the edges 19 and the whole hull being so contoured as to form a forward boat section of conventional substantially wedge-shaped plan appearance.

The dash line 20 in FIG. 1 represents the water line when the boat is moving at high speed. It will be seen that the greater part of the V-shaped keel-like portions 11a and 11b are lifted from the surface, the boat riding on the rear section 17. As the boat lifts and clips through the waves, the water is cut by the keel-like portions to reduce the jarring and slapping effect of the waves on the hull, and air trapped in the wells 14 will provide a cushioning effect which greatly diminishes the uncomfortable and bouncing ride normally experienced with boats of this type lacking the present hull construction.

In FIGS. 6 through 10, another preferred embodiment of a hull structure 29 is illustrated as comprising a rear member 30 center keel-like portion 30a and supplementary keel-like portions 30b extending entirely to the rear of the boat, and forming inverted substantially U-shaped wells 31 decreasing in depth from forward to aft but not diminishing entirely as in the previously described hull 11. The dash line 32 in FIG. 6 indicates the water line when the boat is going at high speed, and it will be seen that the aft end of the wells 31 will be substantially submerged, forming pockets for the entrapment of air as previously described for dampening out the waves.

The outer sides of the keel-like portions 11b and 30b are inclined upward to respectively form generally substantially vertical sides 33 and 34.

The hull 11 is constructed with the flat bottomed aft section 17 preferably for use with a single outboard motor (not shown) to be mounted in the center of the rear member 13. With the hull 29 having the wells 31 extending the entire length of the boat, two outboard motors (not shown) would preferably be used, being mounted on the rear member 30 in substantially vertical alignment with the wells 14.

Although I have described only preferred embodiments of my invention, it will be apparent to one skilled in the art to which the invention pertains that various changes and modifications may be made therein without departing from the spirit of the invention or the scope of the appended claims.

I claim:
1. A power boat hull structure comprising a plurality of contoured longitudinally extending substantially parallel keel-like portions, each portion being substantially V-shaped in lateral cross-section, said portions being conjoined to form longitudinal wells of inverted substan- tially V-shape in lateral cross-section and decreasing in depth from the forward to the aft ends to provide a cushioning effect of waves on the under side of the boat as same is propelled through the water.

2. A power boat hull structure comprising a plurality of contoured longitudinally extending substantially parallel keel-like portions, each portion being substantially V-shaped in lateral cross-section, said portions being conjoined to form longitudinal wells of inverted substantially V-shape in lateral cross-section to provide a cushioning effect of waves on the under side of the boat as same is propelled through the water, said keel-like portions extending substantially the major length of the boat, and only the forward ends of said keel-like portions having upwardly inclined contoured edges.

3. A power boat hull structure comprising a plurality of contoured longitudinally extending keel-like portions substantially parallel for the entire length thereof, each portion being substantially V-shaped in lateral cross-section, said portions being conjoined to form longitudinal wells of inverted substantially V-shape in lateral cross-section to provide a cushioning effect of waves on the under side of the boat as same is propelled through the water, said wells being substantially relatively greater in depth at the forward ends of said keel-like portions than at the aft ends thereof.

4. A power boat hull structure comprising a contoured longitudinally extending keel-like center portion substantially V-shaped in lateral cross-section, and a contoured longitudinally extending keel-like supplementary portion disposed substantially parallel to and laterally spaced from each side of said center portion, said supplementary portions being substantially V-shaped in lateral cross-section and conjoined with said center portion to form longitudinal wells of inverted substantially V-shape in lateral cross-section on each side of said center portion, said wells decreasing in depth from the forward ends to the aft ends to provide a cushioning effect of waves on the under side of the boat as same is propelled through the water.

5. A power boat hull structure comprising a contoured longitudinally extending keel-like center portion substantially V-shaped in lateral cross-section, and a contoured longitudinally extending keel-like supplementary portion disposed substantially parallel to and laterally spaced from each side of said center portion, said supplementary portions being substantially V-shaped in lateral cross-section and conjoined with said center portion to form longitudinal wells of inverted substantially V-shape in lateral cross-section on each side of said center portion to provide a cushioning effect of waves on the under side of the boat as same is propelled through the water, said center portion and said supplementary portions extending substantially the major length of the boat, and only the forward ends of said keel-like portions having upwardly inclined contoured edges.

6. A power boat hull structure comprising a contoured longitudinally extending keel-like center portion substantially V-shaped in lateral cross-section, and a contoured longitudinally extending keel-like supplementary portion disposed substantially parallel to and laterally spaced from each side of said center portion, said supplementary portions being substantially V-shaped in lateral cross-section and conjoined with said center portion to form longitudinal wells of inverted substantially V-shape in lateral cross-section on each side of said center portion to provide a cushioning effect of waves on the under side of the boat as same is propelled through the water, said wells being substantially relatively greater in depth at the forward ends of said portions than at the aft ends thereof.

7. A power boat hull structure comprising a plurality of contoured longitudinally extending substantially parallel keel-like portions, each portion being substantially V-shaped in lateral cross-section, said portions being conjoined to form longitudinal wells of inverted substantially V-shape in lateral cross-section to provide a cushioning effect of waves on the under side of the boat as same is propelled through the water, said keel-like portions extending substantially the major length of the boat and having upwardly inclined contoured forward edges, said wells decreasing in depth from the forward ends of said keel-like portions to the aft ends thereof.

8. A power boat hull structure comprising a plurality of contoured longitudinally extending substantially parallel keel-like portions, each portion being substantially V-shaped in lateral cross-section, said portions being conjoined to form longitudinal wells of inverted substantially V-shape in lateral cross-section to provide a cushioning effect of waves on the under side of the boat as same is propelled through the water, said keel-like portions extending substantially the major length of the boat and having upwardly inclined contoured forward edges, said wells decreasing in depth from the forward ends of said keel-like portions to the aft ends thereof and ending approximately one-quater the overall length of the boat from the aft end thereof.

9. A power boat hull structure comprising a plurality of contoured longitudinally extending substantially parallel keel-like portions, each portion being substantially V-shaped in lateral cross-section, said portions being conjoined to form longitudinal wells of inverted substantially V-shape in lateral cross-section to provide a cushioning effect of eaves on the under side of the boat as same is propelled through the water, said keel-like portions extending substantially the major length of the boat and having upwardly inclined contoured forward edges, said wells decreasing in depth from the forward ends of said keel-like portions to the aft ends thereof, and ending approximately one-quarter the overall length of the boat from the aft end thereof, the aft approximately one-quarter length section of said hull being subtantially flat bottomed, said keel-like portions being contoured to diminish in depth from forward to aft and to thereby merge with the flat bottomed aft section aforesaid.

10. A power boat hull structure comprising a contoured longitudinally extending keel-like center portion substantially V-shaped in lateral cross-section, and a contoured longitudinally extending keel-like supplementary portion disposed substantially parallel to and laterally spaced from each side of said center portion, said supplementary portions being substantially V-shaped in lateral cross-section and conjoined with said center portion to form longitudinal wells of inverted substantially V-shape in later cross-section on each side of said center portion to provide a cushioning effect of waves on the under side of the boat as same is propelled through the water, the outer sides of said supplementary portions being inclined upward to form generally substantially vertical sides for said boat, and an upwardly inclined laterally extending aft end member connecting said sides.

References Cited in the file of this patent

UNITED STATES PATENTS

| | | |
|---|---|---|
| 987,059 | Frampton | Mar. 14, 1911 |
| 1,202,713 | Hedges | Oct. 24, 1916 |
| 2,745,370 | Manis | May 15, 1956 |
| 2,938,490 | Martin | May 31, 1960 |

FOREIGN PATENTS

| | | |
|---|---|---|
| 978,769 | France | Apr. 18, 1951 |
| 19,032 | Great Britain | 1898 |